(12) United States Patent
McGreer et al.

(10) Patent No.: US 6,678,446 B1
(45) Date of Patent: Jan. 13, 2004

(54) MULTI-BAND ARRAYED WAVEGUIDE GRATING

(75) Inventors: Kenneth McGreer, Fremont, CA (US); Jane Lam, San Jose, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 28 days.

(21) Appl. No.: 09/970,207

(22) Filed: Oct. 3, 2001

(51) Int. Cl.[7] .................................................. G02B 6/34
(52) U.S. Cl. ............................. 385/37; 385/14; 385/15; 385/24; 385/39; 385/132; 398/85
(58) Field of Search ............................. 385/24, 31, 37, 385/39; 359/130; 398/85

(56) References Cited

U.S. PATENT DOCUMENTS

| | | | | |
|---|---|---|---|---|
| 5,136,671 A | * | 8/1992 | Dragone | 385/46 |
| 5,845,022 A | * | 12/1998 | Doerr | 385/24 |
| 6,058,233 A | * | 5/2000 | Dragone | 385/46 |
| 6,381,383 B1 | * | 4/2002 | Bernasconi et al. | 385/24 |
| 6,389,201 B1 | * | 5/2002 | Urino | 385/43 |
| 6,512,864 B1 | * | 1/2003 | Lin et al. | 385/24 |
| 6,549,698 B2 | * | 4/2003 | Bernasconi et al. | 385/24 |
| 2002/0057875 A1 | * | 5/2002 | Kaneko | 385/37 |

* cited by examiner

*Primary Examiner*—Brian Healy
*Assistant Examiner*—Daniel Petkovsek
(74) *Attorney, Agent, or Firm*—Amin & Turcoy, LLP

(57) ABSTRACT

An arrayed waveguide grating router (AWGR) comprises sets of output waveguides for a number of bands. Angular separation of adjacent output waveguides is relatively small for adjacent output waveguides. within a band and significantly larger for adjacent output waveguides belonging to different bands. In specific embodiments the output waveguides are arranged into at least two bands, each band comprising at least two adjacent waveguides. Each band is used in conjunction with an input waveguide specific to the particular band. AWGRs according to the invention may be made so that the passbands from a plurality of output waveguides fall on a wavelength grid or a frequency grid. Dummy waveguides may be included for ease of fabrication.

43 Claims, 8 Drawing Sheets

MULTI-BAND ARRAYED WAVEGUIDE GRATING

TECHNICAL FIELD

This invention is in the field of networks for carrying optical signals. The invention relates to apparatus for multiplexing or demultiplexing a number of optical bands. The invention relates more particularly to such apparatus which incorporates arrayed waveguide gratings.

BACKGROUND

Optical fibers provide a way to transmit large volumes of data from place to place. It is often desirable to wavelength multiplex a number of signals onto a single optical fiber. This can be accomplished by passing each signal into a different input of a multiplexer and connecting an output of the multiplexer to the optical fiber. The signals can be recovered at a destination by demultiplexing.

Arrayed waveguide grating routers (AWGRs) are commonly used as multiplexer/demultiplexers in such systems (the same device can typically be used either as a multiplexer, as a demultiplexer, or simultaneously as a multiplexer and a demultiplexer). An arrayed waveguide router uses an arrayed waveguide grating to separate signals by wavelength. Example AWGRs are described in U.S. Pat. Nos. 5,002,350 and 5,136,671, both invented by Dragone.

FIG. 1 shows the main functional parts of a simple prior art AWGR 10. AWGR 10 comprises a pair of free propagation regions which are typically implemented as slab waveguides 20 and 30. The free propagation regions are sometimes referred to as "star couplers". A number, M, of input waveguides 22 couple corresponding input ports 26 to input slab waveguide 20. A number, N, of output waveguides 32 couple slab waveguide 30 to a number of corresponding output ports 36. In the example illustrated in FIG. 1, M=5 and N=5. Input waveguides 22 and ports 26 are labeled with the index p with $0 \leq p \leq 4$. Output waveguides 32 and ports 36 are labeled with the index q with $0 \leq q \leq 4$. The terms "input" and "output" are used herein for reference only. Light can propagate in either direction through AWGR 10.

Waveguides 20 and 30 are coupled to one another by a plurality of grating waveguides 16. Typically grating waveguides 16 each have a different length. The lengths of grating waveguides 16 are spaced from one another by predetermined amounts. Typically light enters AWGR 10 through at least one of input waveguides 22 and, in sequence, propagates through input slab waveguide 20, grating waveguides 16, output slab waveguide 30, and at least one output waveguide 32.

In the AWGR 10 of FIG. 1, light having a wavelength λ which enters AWGR 10 at a certain one of input waveguides 22 is preferentially coupled into a specific one of output waveguides 32. AWGR 10 has an optical passband associated with each pair of an input port 26 and an output port 36. In general, a port is a location at which a waveguide of AWGR 10 couples to an optical pathway that is external to AWGR 10. For example, a port might be a location at which an input or output waveguide couples to an optical fiber external to the PLC on which the AWGR is fabricated. Within each optical passband the optical transmission between input port p and output port q is optimized for a range of wavelengths that are centered at the nominal wavelength for the passband, λ. This can be achieved by designing the AWGR to satisfy the following equation:

$$m\lambda = n_s \times d_I \times \sin(\theta_p) + n_s \times d_o \times \sin(\alpha_q) + n_c \Delta L_i \quad (1)$$

where:

λ is the wavelength;

$n_s$ is the effective index of refraction of slab waveguides 20 and 30;

$n_c$ is the effective index of refraction of channel waveguides 16;

$d_I$ and $d_o$ are the center-to-center separations of grating waveguides 16 at the points where they couple to input slab waveguide 20 and output slab waveguide 30 respectively;

ΔLi is the difference in length between adjacent grating waveguides 16;

m is the diffraction order for a particular passband associated with an input port p and an output port q;

$\theta_p$ is the angle between the point at which the $p^{th}$ input waveguide 22 couples to slab waveguide 20 and an axis, A, of the focal curve on which arrayed waveguides 16 couple to slab waveguide 20 as shown in FIG. 1; and, $\alpha_q$ is the angle between the point at which the $q^{th}$ output waveguide 32 couples to slab waveguide 30 and axis A of the focal curve on which arrayed waveguides 16 couple to slab waveguide 30 as shown in FIG. 1.

For simplicity, in the following discussion it is assumed that $d_I = d_o = d$. In general, $d_I$ and $d_o$ can be different. Also for simplicity, the length difference $\Delta L_i$ between adjacent waveguides 16 of the arrayed waveguide grating is assumed to have a constant value ΔL. By applying small angle approximations to the sine functions of Equation (1) the relationship of Equation (1) can be recast as:

$$\theta_p + \alpha_q = \left(\frac{m'}{n_s} \times d\right)(\lambda - \lambda_c) \quad (2)$$

where:

$\lambda_c$ is the wavelength of light diffraction order m that will propagate from the center (or "pole") of the input focal curve to the center (or "pole") of the output focal curve (i.e. from $\theta_p=0$ to $\alpha_q=0$); and, m' is given by:

$$m' = m\left(1 + \left(\frac{\lambda_c}{n_{c0}}\right)\left(\frac{dn_c}{d\lambda}\right)\right) \quad (3)$$

where:

$n_{c0}$ is the value of $n_c$ for light of wavelength $\lambda_c$.
Equation (3) involves the value $$\left(\frac{dn_c}{d\lambda}\right)$$

which is a function of λ. In general, however, $$\left(\frac{dn_c}{d\lambda}\right)$$

varies slowly with wavelength and so, for most wavelengths of interest, the value of $$\left(\frac{dn_c}{d\lambda}\right)$$

can be approximated by its value for $\lambda=\lambda_c$.

The basic construction of FIG. 1 can be customized for specific applications by altering: the locations at which input waveguides 22 and AWG waveguides 16 couple to input slab waveguide 20; the locations at which output waveguides 32 and AWG waveguides 16 couple to output slab waveguide 30; the dimensions of slab waveguides 20 and 30; and, the relative lengths of AWG waveguides 18. For example, it is known to provide a 1×N demultiplexer by providing an input waveguide located so that $\theta_p=0$ and output waveguides located at angular positions which satisfy the relationship:

$$\alpha_q = \left(\frac{m'}{n_s}d\right)(\lambda_0 - \lambda_c + q\Delta\lambda) \tag{4}$$

where:
- q=0, 1, 2, 3, ... N−1;
- $\Delta\lambda$ is a constant; and,
- $\lambda_0$ is the nominal wavelength of the passband for which p=0 and q=0.

In such implementations, the passbands lie on a wavelength grid. That is, the wavelengths of the passbands are centered at wavelengths given by:

$$\lambda=\lambda_0+q\Delta\lambda \tag{5}$$

FIG. 2A is a block diagram of a 1×6 demultiplexer. In FIG. 2A and the other block diagrams referred to herein the "input" waveguides are the lines entering the block from the left, the "output" waveguides are the lines leaving the block on the right, the sequence of output waveguides is the same as would be present in a physical device, and the sequence of input waveguides is reversed from that of the physical device (in the example of FIG. 2A there is no sequence of input waveguides because there is only one input waveguide). Each of the arrows within the block indicate light of a particular wavelength $\lambda$ being coupled from one of the input waveguides to one of the output waveguides. The slopes of the arrows within the block are proportional to the value of $\lambda-\lambda_0$. So, for example, an arrow representing optical coupling of a signal with wavelength $\lambda_0$ extends, straight across the box.

A problem encountered in manufacturing such demultiplexers is that variations in manufacturing processes may cause $\lambda_0$ to depart, from its intended value. This results in reduced yields because manufactured demultiplexers having values for $\lambda_0$ falling outside of an acceptable range cannot be used.

Some prior art demultiplexers address this problem by providing several inputs, each corresponding to a different value of $\lambda_0$. An input which provides a value of $\lambda_0$ lying in the acceptable range can be selected. An example of such a construction provides three input waveguides which couple to slab waveguide 20 at angles given by:

$$\theta_g = \left(\frac{m'}{n_s}d\right)(1-\delta)g \tag{6}$$

where:
- g is an integer in the range of −1≤g≤1; and, δ is a value smaller than 1.

Output waveguides couple to output slab waveguides at angular positions given by:

$$\alpha_{q,g} = \left(\frac{m'}{n_s}d\right)(\lambda_0 - \lambda_c + (q+g)\Delta\lambda) \tag{7}$$

where q=0, 1, 2, 3, ... N+1. When a particular one of the input waveguides is used (i.e. a specific value is selected for g) then N of the output waveguides can be selected such that:

$$n_s d(\theta_g+\alpha_{q,g})=m'\Delta\lambda q+m'(\lambda_0-\lambda_c+\Delta\lambda\delta g) \tag{8}$$

For each value of q, the passbands lie on a wavelength grid according to:

$$\lambda=(\lambda_0+\Delta\lambda\delta g)+q\Delta\lambda \tag{9}$$

It can be seen that the wavelengths of all of the passbands can be shifted in increments of the small amount $\Delta\lambda\delta g$ by selecting an appropriate one of the input waveguides. This is valuable because it allows drifts in $\lambda_0$ which result from manufacturing process variations to be compensated for. If the fabrication process yields an AWG with the intended value of $\lambda_0$ then the output waveguide set associated with g=0 can be used with the resulting passbands having wavelengths of the intended values given by Equation 5. Where variations in the fabrication process result in an AWG that has a value of $\lambda_0$ that differs from the intended value, the difference between the actual and intended values of $\lambda_0$ can be reduced by an amount equal in magnitude to $\Delta\lambda\delta$ by selecting either the output waveguide set associated with g=1 or with g=−1. Reducing the difference by this amount may be sufficient to make an AWG meet specifications applicable for use in a particular application when it would otherwise not meet the specifications.

It is known in the prior art that a number of AWGRs may be combined in a single module to permit N input signals to be demultiplexed into Q output signals. Such Q×N AWGR modules are, however, undesirably complicated to manufacture and to manage.

U.S. Pat. No. 6,181,849 discloses a single AWGR configured to separate signals from two input waveguides into two output bands. As shown in FIG. 2B, the wavelengths within each band are interlaced with the wavelengths in other bands. Further, the disclosed scheme cannot readily be extended to more than two inputs.

There is a need for Q×N AWGRs which are more flexible than those provided in the prior art. There is a need for AWGRs which permit N input signals to be demultiplexed into Q output passbands.

Summary of the Invention

This invention provides optical devices which make possible alternative ways to combine or separate optical signals. The use of devices according to the invention provides convenient alternatives to presently known optical circuits.

One aspect of the invention provides an optical apparatus comprising: a plurality of input waveguides; a first free propagation region optically coupled to the plurality of input waveguides; a second free propagation region; an arrayed waveguide grating optically coupling the first and second free propagation regions; and first, second and third output waveguides optically coupled to the second free propagation region. The output waveguides are coupled to the second free propagation region at angles $\alpha_{a-1}$, $\alpha_a$ and, $\alpha_{a+1}$ respectively. The first output waveguide is adjacent to the second output waveguide and the second output waveguide is adjacent to the third output waveguide. According to this aspect of the invention, R given by:

$$R = 2 \times \left| \frac{(\alpha_{a-1} - 2\alpha_a + \alpha_{a+1})}{(\alpha_{a-1} - \alpha_{a+1})} \right|$$

has a value of 0.1 or more.

Another aspect of this invention provides an arrayed waveguide grating device which comprises: a first free propagation region; a plurality of input waveguides optically coupled to the first free propagation region; a second free propagation region; an optical grating comprising a plurality of unequal length grating waveguides optically coupling the first and second free propagation regions; and, N groups of Q sequential output waveguides coupled to the second free propagation region at angular locations $\alpha_q$. q is an index which ranges over the values $0, 1, \ldots, Q \times N - 1$. $\alpha_q$ changes monotonically as q increases. The arrayed waveguide grating device is characterized in that each of the N groups of output waveguides is associated with at least one of the input waveguides and for each of the N groups, angular spacings between adjacent output waveguides both belonging to the group are significantly less than angular spacings between any waveguide in the group and any waveguide in any other group. For each of the waveguides in each of the N groups and the associated input waveguide there exists a passband and a range of the wavelengths associated with the passbands for each of the N groups is non-overlapping with the range of passband wavelengths for other ones of the N groups.

In some preferred embodiments of the invention the passband wavelengths of the output waveguides are substantially on a frequency grid. In other preferred embodiments of the invention the passband wavelengths of the output waveguides are substantially on a wavelength grid.

A device according to the invention may be used in combination with an optical device operating as a 1×N demultiplexer having N outputs. Each of the outputs is optically coupled to one of the input waveguides associated with a different one of the N groups. An optical switch may be provided in each of one or more of the optical paths which extend between the N outputs of the demultiplexer and the corresponding input waveguides to which the N outputs are coupled. The optical switches may be used to simultaneously switch all of a plurality of signals in a wavelength or frequency band to a different destination.

In another aspect of the invention the angular spacing of consecutively adjacent ones of the output waveguides is characterized by the magnitude of the value R given by:

$$R = \frac{\left| \left( \frac{d^2 \alpha_q}{dq^2} \right) \right|}{\left| \left( \frac{d \alpha_q}{dq} \right) \right|}$$

having a value of 0.1 or more for at least some sets of adjacent ones of the output waveguides.

Here, $$\left( \frac{d \alpha_q}{dq} \right)$$

is the discrete derivative of $\alpha q$, and $$\left( \frac{d^2 \alpha_q}{dq^2} \right)$$

is the discrete second derivative of $\alpha q$.

Preferably, for each of at least two of the plurality of input wave guides there exists a distinct group of the output waveguides having associated passbands such that ranges of wavelengths of the passbands corresponding to the distinct groups are non-overlapping and ranges of values of q corresponding to the waveguides in each of the distinct groups are non-overlapping.

A still further aspect of the invention provides an optical apparatus. The optical apparatus comprises at least first and second input waveguides; an input free propagation region optically coupled to the first and second input waveguides; an output free propagation region; and an arrayed waveguide grating optically coupling the input and output free propagation regions. The optical apparatus has M output waveguides, where M is an integer and $M \geq 4$. Each of the output waveguides is optically coupled to the output free propagation region at an angular position $\alpha_i$ relative to an axis of the arrayed waveguide grating, where i is an index which increases with angular position and $0 \leq i \leq M-1$. No output waveguides are located between any two adjacent ones of the output waveguides. Each of a first M−1 of the output waveguides is separated from an adjacent one of the output waveguides by an angular spacing $\Delta_i = |\alpha_{i+1} - \alpha_i|$. $\Delta_i$ varies periodically with i.

In preferred embodiments of the invention, when i has some value a, $|\Delta_a - \Delta_{a+1}| > 0.005 \times |\Delta_a + \Delta_{a+1}|$. Most preferably, $|\Delta_a - \Delta_{a+1}| > 0.05 \times |\Delta_a + \Delta_{a+1}|$.

Further features and advantages of the invention are discussed below.

BRIEF DESCRIPTION OF THE DRAWINGS

In figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
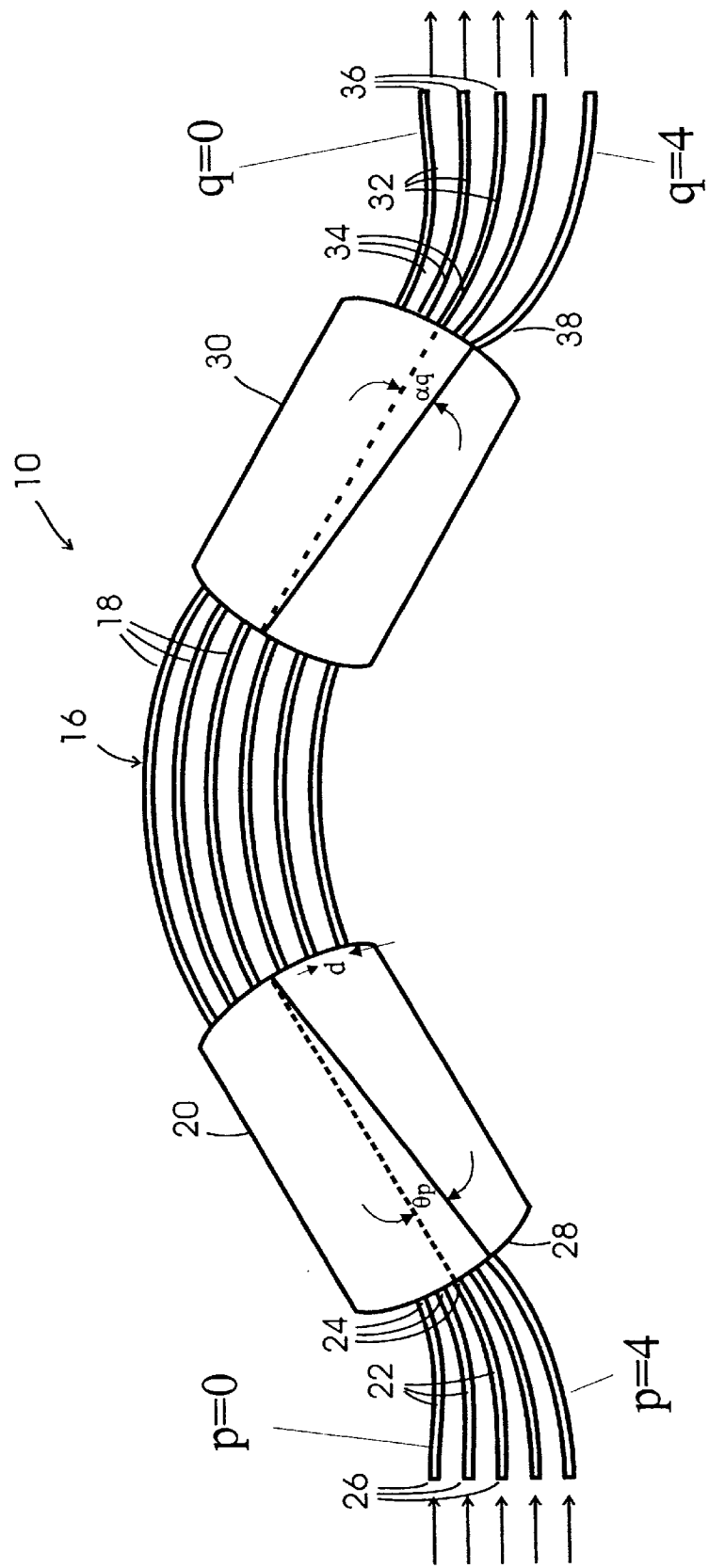
FIG. 1 is a schematic view of the functional parts of a prior art arrayed waveguide grating router.
Figure 2A:
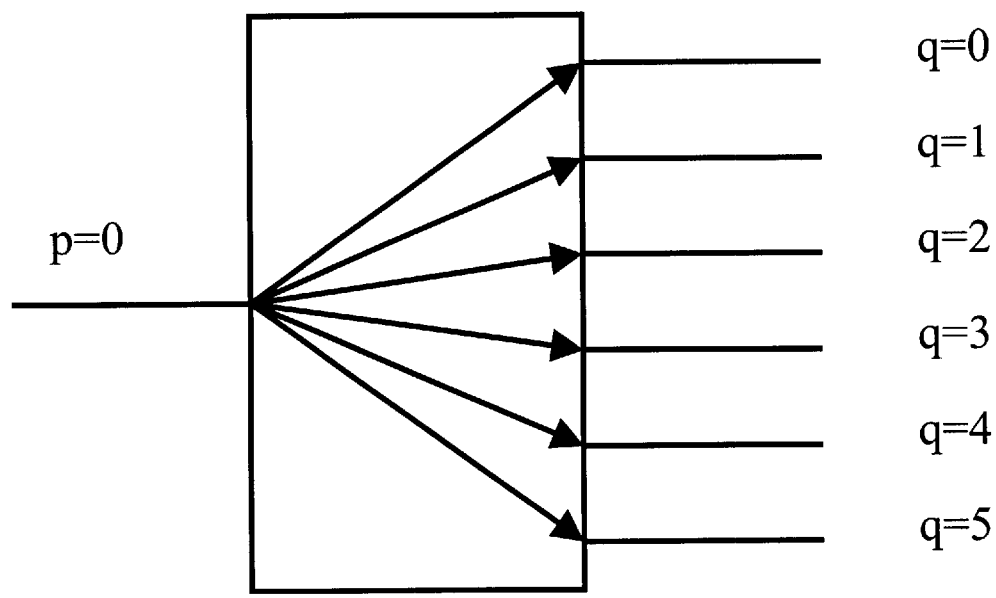
FIG. 2A is a schematic block representation of a prior art 1×6 demultiplexer.
Figure 2B:
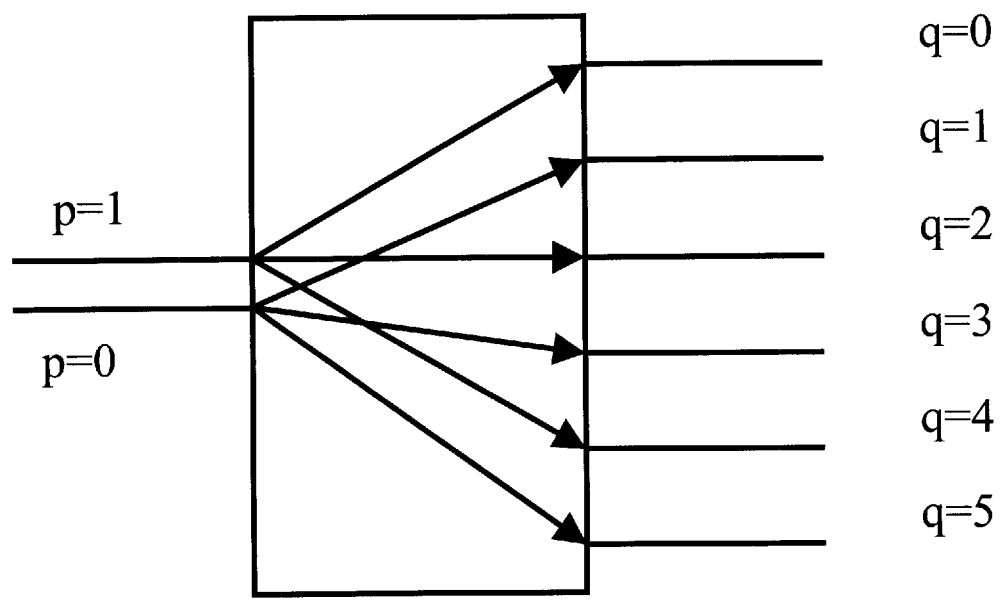
FIG. 2B is a schematic block representation of a prior art 1×6 demultiplexer with two inputs and interleaved outputs.
Figure 3:
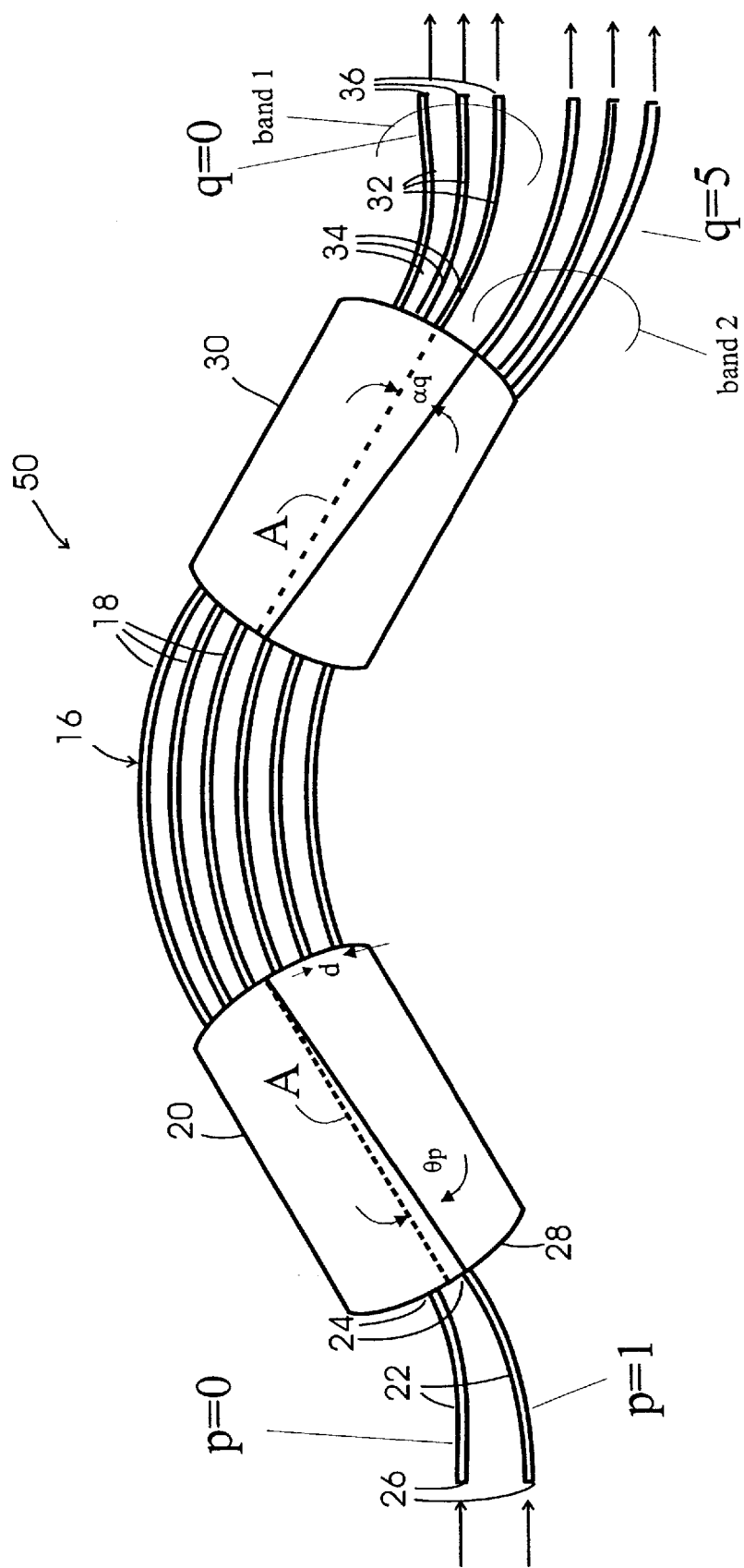
FIG. 3 is a schematic view of functional parts of an arrayed waveguide grating router according to an illustrative example embodiment of the invention.

FIG. 3 shows an AWGR 50 according to the invention. Elements shown in FIG. 3 which are identified by the same reference numerals as corresponding elements shown in FIG. 1 may have similar constructions. Generally AWGR 50 has a plurality of output waveguides 32. The qth output waveguide 32 is situated at angle $\alpha_q$. As noted above, the terms "output" and "input" are used only as names to distinguish different elements of AWGR 50. The use of these terms does not impose any restriction on the direction in which light may propagate through AWGR 50. In a selected-application, light may enter an "input" waveguide and emerge through one or more "output" waveguides. Light may also enter AWGR 50 through an "output" waveguide and emerge through one or more "input" waveguides. In some applications light may propagate simultaneously through AWGR 50 in opposing directions.

Generally an AWGR according to the invention is configured to satisfy Equation (1). It is not necessary that $d_f$ and $d_o$ be equal. For illustrative purposes AWGRs for which $d_f=d_o$ are described here in detail. Those skilled in the art will readily understand how the invention may be applied in cases where $d_f \neq d_o$. Similarly, it is not necessary that each grating waveguide 16 differs in length from its neighbors by a fixed amount $\Delta L$. While the following discussion assumes the case that $\Delta L$ has a fixed value to simplify the explanation of the invention, those skilled in the art will recognize that the invention may also be applied in cases wherein $\Delta L$ is varied.

The angular separation between adjacent output waveguides is given by the discrete derivative:

$$\frac{d\alpha_q}{dq} = \frac{\alpha_{q+1} - \alpha_{q-1}}{2} \quad (14)$$

and the rate of change of the angular separation between adjacent output waveguides as a function of q is given by the discrete second derivative:

$$\frac{d^2\alpha_q}{dq^2} = \alpha_{q+1} - 2\alpha_q + \alpha_{q-1} \quad (15)$$

The smoothness of the rate of change of the angular separation between adjacent output waveguides is given by R, which is defined as $$R = \frac{\left|\left(\frac{d^2\alpha_q}{dq^2}\right)\right|}{\left|\left(\frac{d\alpha_q}{dq}\right)\right|} \quad (16)$$

Prior art AWGs are generally designed so that R has a small value. In prior art AWGs R is typically about $2\Delta v/v$ where $\Delta v$ is the channel spacing in frequency and $v$ is the optical frequency. For example, in a typical prior art AWGR with a 100 GHz channel spacing and an optical frequency of about 190 THz, the value of R is about 0.001. AWGRs according to this invention are constructed so that R oscillates. In some preferred embodiments of the invention R is a periodic function of q. In preferred embodiments of the invention R has a maximum value of at least 0.1. Preferably R does not have a value exceeding 0.01 for any two successive values of q. That is, preferably if R has a value exceeding 0.01 for one or more particular values of q, then for values of q adjacent to those particular values, R has a value not exceeding 0.01. In general, the angular separation of the output waveguides is not uniform. In some preferred embodiments of the invention, the angular separation of the output waveguides is a periodic function of q.

In preferred embodiments of the invention, when q has some value a, $|\Delta_a - \Delta_{a+1}| > 0.005 \times |\Delta_a + \Delta_{a+1}|$. Most preferably, $|\Delta_a - \Delta_{a+1}| > 0.05 \times |\Delta_a + \Delta_{a+1}|$.

FIRST EXAMPLE EMBODIMENT

In an AWGR 50 according to a first embodiment of the invention, Q×N output waveguides 32 are coupled to output slab waveguide 50 at angular locations $\alpha_q$ which satisfy:

$$\alpha_q = \alpha_0 + \left(\frac{m'\Delta\lambda}{n_s d}\right)\left(q + (s+e)floor\frac{q}{Q}\right) \quad (17)$$

where:
"floor" is the greatest integer function, i.e. its value is the largest integer that is not greater than its argument;
q=0,1,2, . . . (Q N−1);
p=0,1,2, . . . (N−1);
s is a positive integer; and,
e is a number between zero and unity (preferably e is greater than about 0.1).

The plurality of output waveguides is preferably centered at the pole of the output focal curve, which is directly opposite the AWG grating region. That is, preferably:

$$\alpha_0 + \alpha_{QN-1} = 0 \quad (18)$$

N input waveguides are coupled to input slab waveguide 20 at angular locations $\theta_p$ which satisfy:

$$\theta_p = \theta_0 - \left(\frac{m'\Delta\lambda}{n_s d}\right)(s+e)p \quad (19)$$

Preferably the plurality of input waveguides is centered at the pole of the input focal curve, which is directly opposite the AWG grating region. That is, preferably:

$$\theta_0 + \theta_{N-1} = 0 \quad (20)$$

The AWGR according to this first example embodiment of this invention also satisfies the condition:

$$n_s d(\theta_0 + \alpha_0) = m'(\lambda_0 - \lambda_c) \quad (21)$$

Those skilled in the art will observe that this embodiment of AWGR 50 has a layout resembling that of an N×M router. The construction of AWGR 50 is such that AWGR 50 can function as N independent 1×Q demultiplexers. The M passbands are thereby arranged into N bands, with Q passbands (referenced by Q consecutive values of q) within each band and M=Q×N.

In operation, output waveguides 32 are divided into N groups. The output waveguides of each of the groups are used in conjunction with one of the input waveguides. Specifically, each output waveguide is used in conjunction with the output waveguide that is determined by:

$$p = \text{floor}\left(\frac{q}{Q}\right) \quad (22)$$

For those input/output combinations which satisfy Equation (18) it follows that:

$$n_s d(\theta_p + \alpha_q) = m'\Delta\gamma q + m'(\lambda_0 - \lambda_c) \quad (23)$$

With these input/output combinations, the passbands lie on a wavelength grid without gaps, i.e., the passbands are centered at wavelengths according to Equation (5) for q=0, 1,2, . . . , (M−1) The passbands within the first band are given by Equation (5) with q=0,1,2, . . . (Q−1); the passbands within the second band are given by Equation (5) with q=Q, (Q+1),(Q+2), . . . (2Q−1), etc.

One characteristic of this example embodiment of the invention is that the angular separation between adjacent output waveguides 32 is not a slowly varying function of q. Instead, the angular separation is a periodic function of q which has a period N. According to Equation 13, the angular separation between output waveguides is equal to:

$$\left(\frac{m'\Delta\lambda}{n_s d}\right)$$

for the Q output waveguides within any of the bands. However, the angular separation between two adjacent waveguides when one waveguide is in one band and the other waveguide is in an adjacent band is equal to $$(1+s+e)\left(\frac{m'\Delta\lambda}{n_s d}\right).$$

Mathematically this can be expressed as:

$$\alpha_q - \alpha_{q-1} = \left(\frac{m'\Delta\lambda}{n_s d}\right)(1 + (s+e)\delta_{q,iQ}) \quad (24)$$

where $\delta_{a,b}$ is Kroneker's delta function and I may be any integer. This neglects the wavelength dependence of $n_s$. Those skilled in the art will be able to amend equation (20) to take the wavelength dependence of $n_s$ into account to any desired degree of accuracy.

In this embodiment of the invention, when q+2, q+1 and q identify output waveguides within a common band, and $n_s$ is independent of wavelength, the value of R is zero. When one of the output waveguides identified by the indices q+2, q+1 and q is in one band and the other two are in another band, then the value of R is approximately equal to (s+e), which is typically larger than unity.

Figure 4:
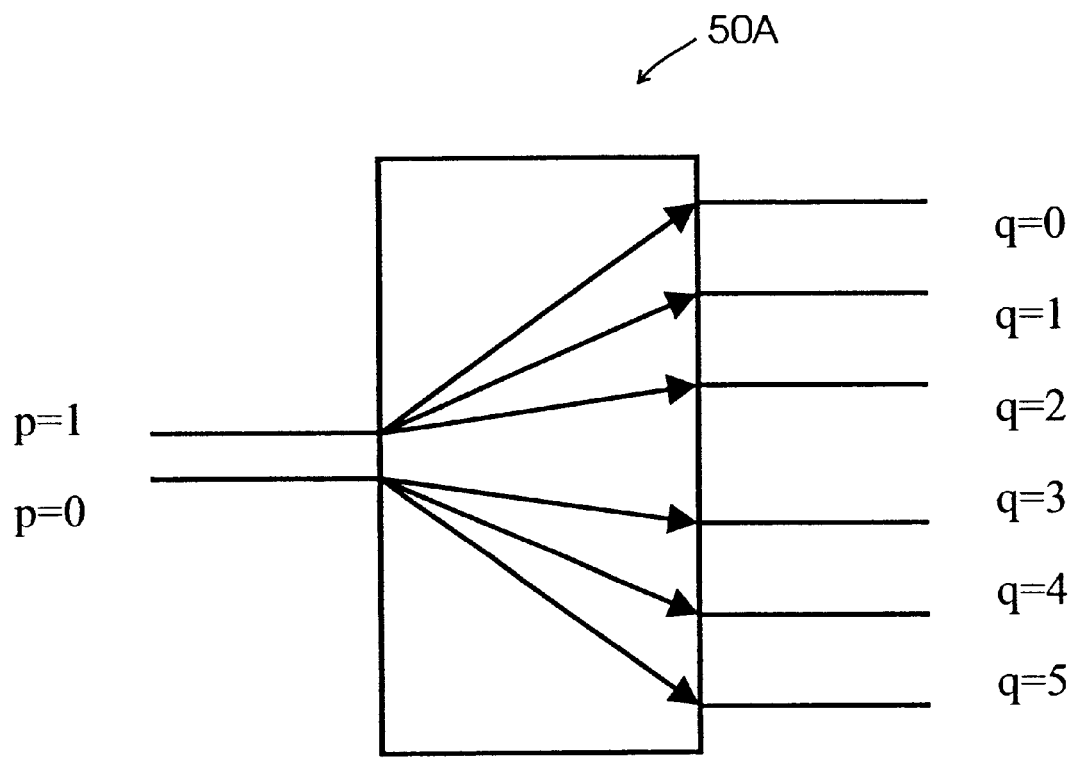
FIG. 4 is a schematic block representation of a demultiplexer according to a first embodiment of the invention.

FIG. 4 is a schematic block diagram of a 2×6 AWGR 50A according to this embodiment of the invention. AWGR 50A can function as 2 independent 1×3 demultiplexers which operate on different bands. The three outputs for each band are physically clustered together, emerge from AWGR 50A in wavelength sequence and are separated from the outputs for other bands. The outputs from one band are not interleaved with outputs from other bands.

In preferred embodiments of the invention, additional output waveguides are provided. These additional waveguides (which may be called "dummy" waveguides) do not need to be connected to output ports. Typically, relatively little light enters the dummy waveguides. Light that does enter a dummy waveguide is preferably allowed to radiate from the dummy waveguide in a manner that minimizes the amount of light that can cross over to any of output waveguides 32. The light may radiate from the dummy waveguide gradually over a distance or in a concentrated manner at a termination point.

The purpose of the dummy waveguides is to improve the uniformity with which output waveguides 32 can be fabricated. Without dummy waveguides those output waveguides 32 which lie at one end of a band have a different environment from those output waveguides 32 which lie within a band.

As an example, an AWGR according to the invention may be made with output waveguides coupled to output slab waveguide 30 at angular positions given by:

$$\alpha_q = \alpha_0 + \left(\frac{m'\Delta\lambda}{n_s d}\right)\left(q - s' + \text{floor}\left(\frac{(q-s')}{(Q+s)}\right)\right) \quad (25)$$

where s' is an integer with $0 \leq s' \leq s$. With this 5 arrangement:

$$\alpha_q - \alpha_{q-1} = \left(\frac{m'\Delta\lambda}{n_s d}\right)(1 + e\delta_{q,iQ}) \quad (26)$$

Only those output waveguides which satisfy equation (13) are used as output waveguides. The remaining waveguides are kept as dummy output waveguides and are not coupled to output ports.

In an embodiment of the invention which provides dummy waveguides according to equation (21), when q+2, q+1 and q identify output waveguides within a common band, and $n_s$ is independent of wavelength, the value of R is zero. When one of the output waveguides identified by the indices q+2, q+1 and q is in one band and the other two are in another band, then the value of R is approximately equal to e, which is typically larger than 0.1.

Figure 6A:
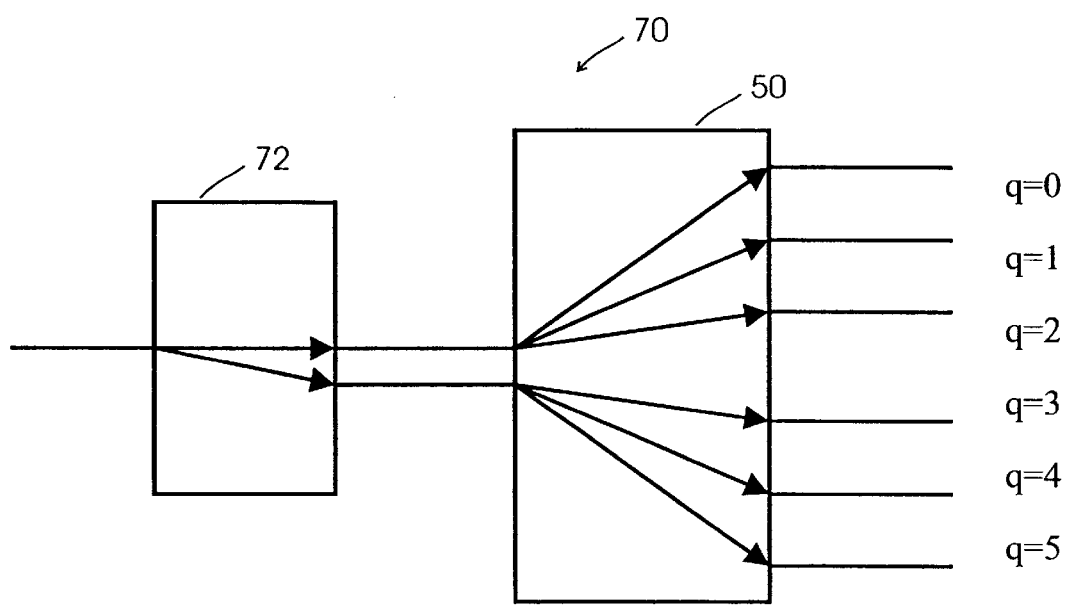
FIG. 6A is a schematic representation of an AWGR according to one embodiment of the invention applied in a multi-band demultiplexer; and, FIG. 6B is a schematic representation of an AWGR according to one embodiment of the invention applied in a multi-band demultiplexer which provides switches for redirecting entire bands of channels.

The AWGR of FIG. 3 may be applied, for example, in the multi-band demultiplexer 70 shown in FIG. 6A. Demultiplexer 70 includes a 1×Q demultiplexer 72 (in the Figure, Q=2). The Q outputs of demultiplexer 72 are each connected to one of the Q inputs of an AWGR 50 according to the invention. This improves on prior art multi-stage demultiplexers in which the second stage is implemented using Q individual 1×M demultiplexers. It can also be appreciated that an AWGR 50 according to this embodiment of the invention is convenient because the output waveguides for each band are clustered together and are adjacent to one another.

Figure 6B:
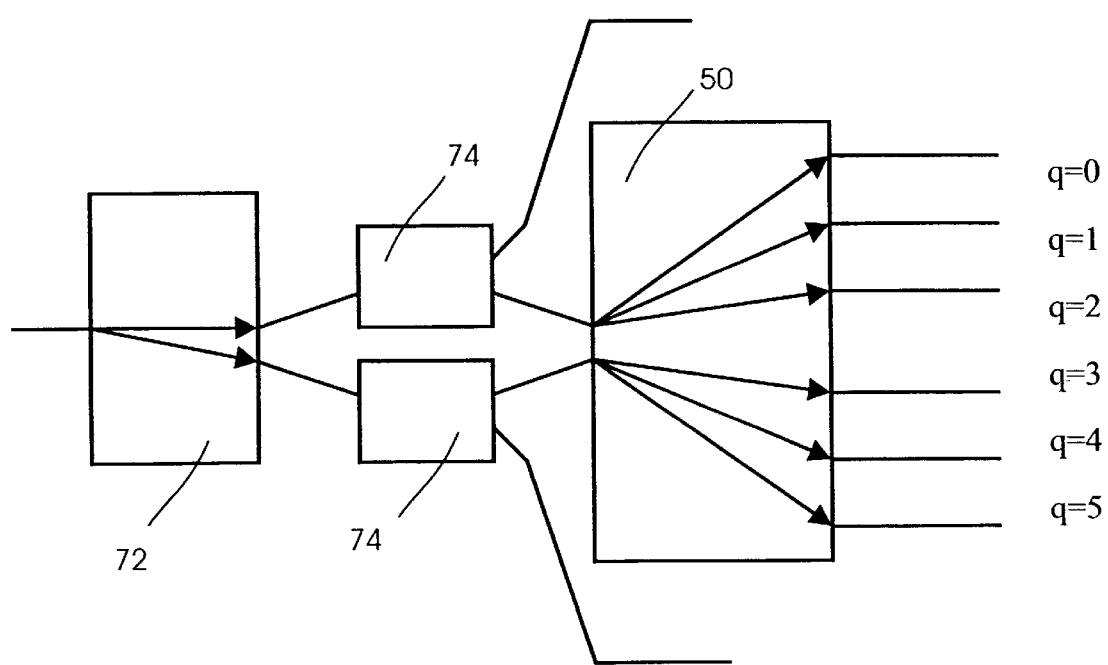

As shown in FIG. 6B, optical switches 74 may be inserted between one or more of the output ports of demultiplexer 72 and the corresponding input ports of AWGR 50. It can be appreciated that a single optical switch permits an entire band of channels to be redirected.

SECOND EXAMPLE EMBODIMENT

A second embodiment of the invention provides an AWGR 50 having (Q+G−1)×N output waveguides and G×N input waveguides. The output waveguides are coupled to output slab waveguide 30 at angular positions which satisfy:

$$\alpha_{q,g} = \alpha_0 + \left(\frac{m'\Delta\lambda}{n_s d}\right)\left(q + (s+e)\text{floor}\left(\frac{q}{Q}\right) + g\right) \quad (27)$$

The input waveguides are coupled to input slab waveguide 20 at angular positions which satisfy:

$$\theta_{p,g} = \theta_0 - \left(\frac{m'\Delta\lambda}{n_s d}\right)[(s+e)p + g(1-\delta)] \quad (28)$$

In equations (23) and (24):

q=0,1,2, . . . N(Q+2)−1;

p=floor (q/Q);

g is an integer selected from a predetermined set of integers. In one embodiment g∈{−1, 0, 1}:

G is the number of members in the set from which g is selected; and, s≧G.

With an AWGR constructed according to equations (23) and (24), the input waveguides are divided into groups with each group of input waveguides associated with a specific value of g. For each value of g there is a target set of output waveguides. The target sets of output waveguides are each divided into N bands with Q passbands within each of the N bands.

Figure 5A:
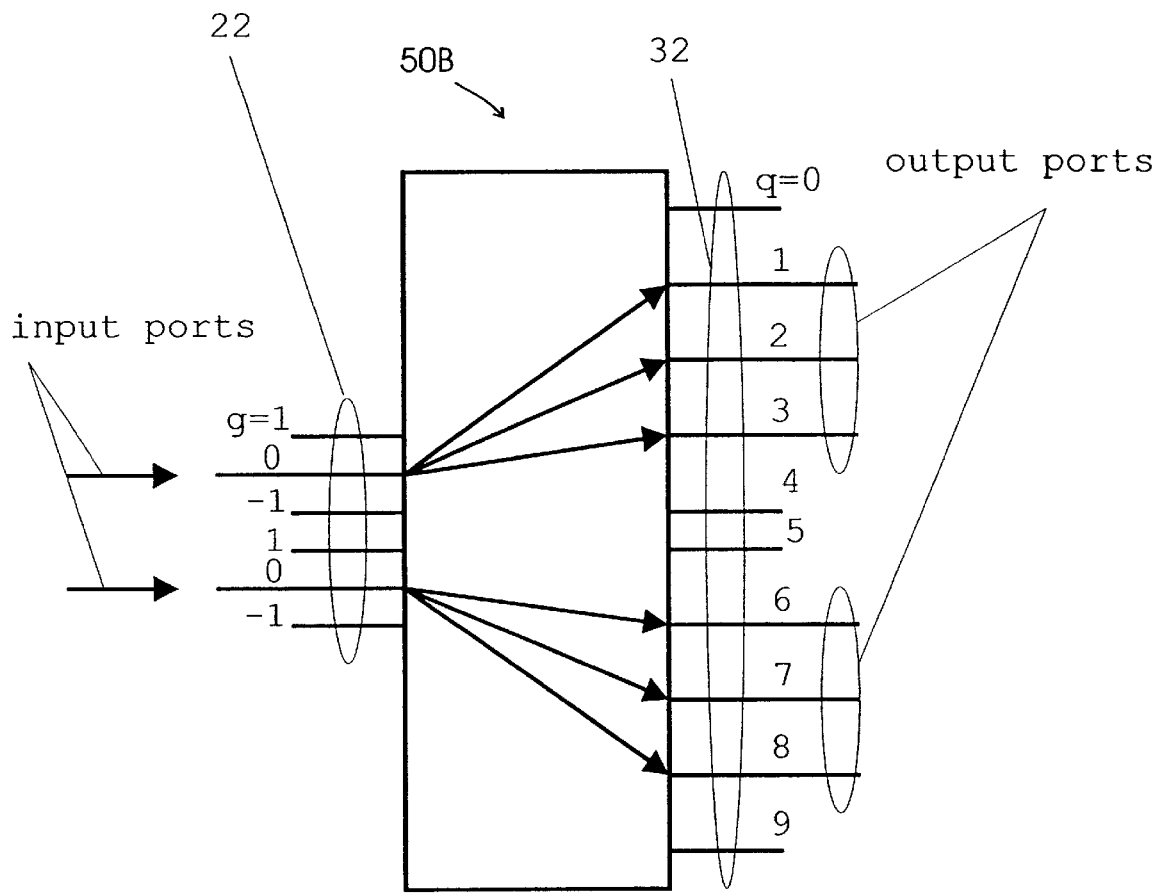
FIG. 5A is a schematic block representation of a demultiplexer according to a second embodiment of the invention.

FIG. 5A is a block diagram representation of a simple AWGR 50B according to this embodiment of the invention. AWGR 50B has six input waveguides in two groups, each group containing three input waveguides. One group corresponds to p=0. The other group corresponds to p=1. Each group of input waveguides includes waveguides corresponding to g=−1, g=0, and g=1.

AWGR 50B has ten output waveguides in two groups. Each group of output waveguides corresponds to one of the groups of input waveguides.

In operation, each output waveguide is used in conjunction with one of the input waveguides. Those input waveguides which are available, but not being used, may be called auxiliary waveguides. Specifically, each output waveguide is used in conjunction with the input waveguide that satisfies p=floor (q/Q). These input/output waveguide combinations satisfy the following relationship:

$$n_s d(\theta_{p,g} + \alpha_{q,g}) = (m'\Delta\lambda)(q) + m'(\Delta\lambda g\delta + \lambda_0 - \lambda_c) \quad (29).$$

Figure 5B:
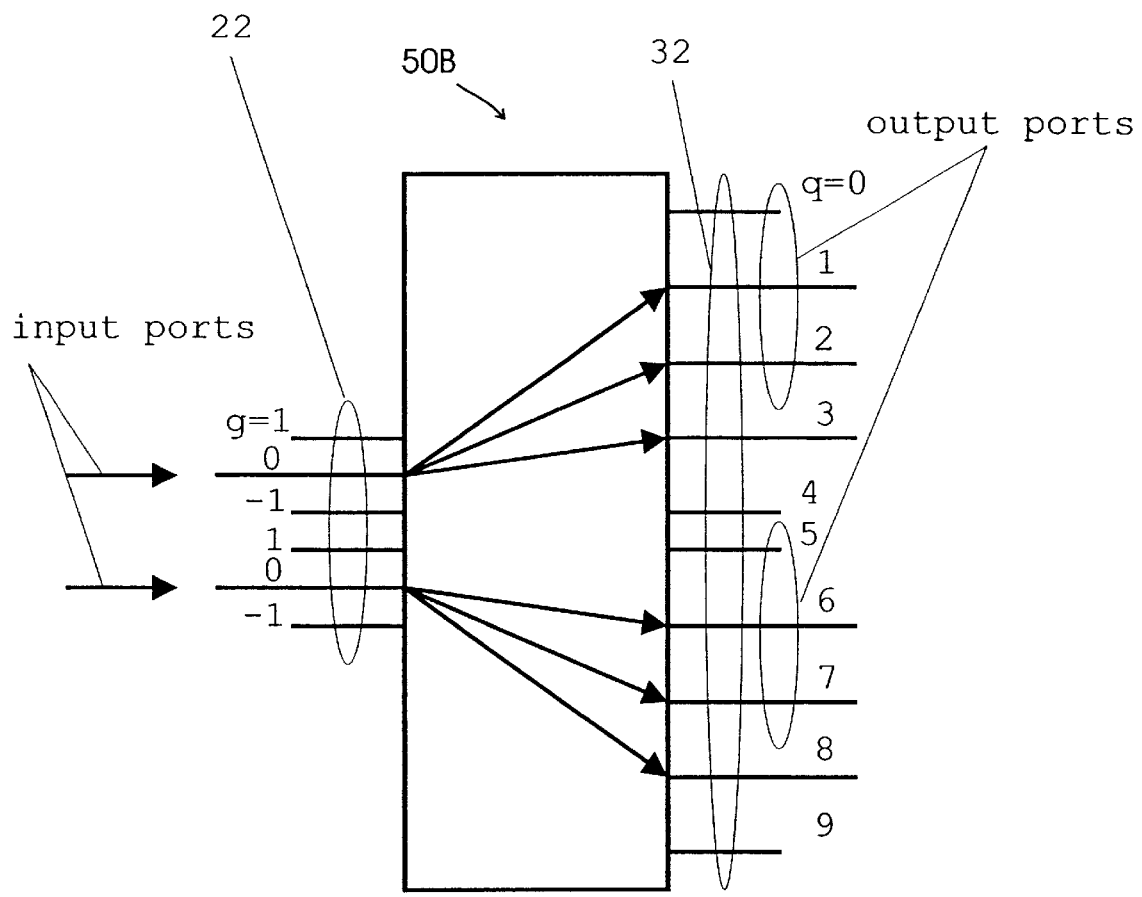
FIG. 5B is a schematic block representation of the demultiplexer of FIG. 5A illustrating how tuning can be achieved by selecting alternative input waveguides.

FIG. 5A shows that with input signals connected to the two inputs for which g=0, output signals at wavelengths of $$\lambda = \lambda_0 + q\Delta\lambda \quad (30)$$

are coupled to the outputs labeled q=0 through q=5. As shown in FIG. 5B, by switching the input signals to the input waveguides corresponding to g=1, and by moving the output for each channel to the next group of output ports the wavelength coupled to each channel can be increased by an amount $\Delta\lambda\delta g$.

In general, for each value of g, the passbands fall on a wavelength grid according to $$\lambda = (\lambda_0 + \Delta\lambda\delta g) + q\Delta\lambda \quad (31)$$

Hence, changing g in value from 0 to 1, shifts all the passbands in wavelength by an amount $\Delta\lambda\delta$. Conversely, changing g in value from 0 to −1, shifts all the passbands in wavelength by $-\Delta\lambda\delta$. Thus, an AWGR according to this embodiment of the invention provides N 1×Q multiplexers (or demultiplexers) each having a grid of wavelengths which can be tuned by selecting an input waveguide corresponding to an appropriate value for g. The potential value of this is apparent from the discussion in the background section of this disclosure.

In this embodiment of the invention, when q+2, q+1 and q identify output waveguides within a common band, and $n_s$ is independent of wavelength, the value of R is zero. When one of the output waveguides identified by the indices q+2, q+1 and q is in one band and the other two are in another band, then the value of R is approximately equal to (s+e), which is typically larger than 1.

Dummy waveguides may also be provided in this embodiment of the invention substantially as described above. When dummy waveguides are provided, as described above, the maximum value of R will be approximately e, which is typically larger than 0.1.

THIRD EXAMPLE EMBODIMENT

A third embodiment of the invention provides an AWGR 50 having Q×N output waveguides 32 coupled to output slab waveguide 30 at angular locations $\alpha_q$ which satisfy:

$$\alpha_q = \alpha_0 + \left(\frac{m'c}{n_s d}\right)\left[\frac{1}{v_0 - q\Delta v} - \frac{1}{(v_0 + p(s+e)\Delta v)}\right] \quad (32)$$

N input waveguides are coupled to input slab waveguide 20 at angular positions which satisfy:

$$\theta_p = \theta_0 + \left(\frac{m'c}{n_s d}\right)\left[\frac{1}{(v_0 + p(s+e)\Delta v)} - \frac{1}{v_0}\right] \quad (33)$$

In equations (27) and (28):

c is the speed of light in vacuum; and, p=floor (q/Q)

As long as p=floor (q/Q) then:

$$n_s d(\theta_p + \alpha_q) = (m'c)\left[\frac{1}{v_0 - q\Delta v} - \frac{1}{v_0} + \lambda_0 - \lambda_c\right] \quad (34)$$

It can be seen that this embodiment is similar to the first embodiment described above except that the passbands are on a frequency grid rather than a wavelength grid, i.e., the optical frequencies of the passbands are given by:

$$v = v_0 + q\Delta v \quad (35)$$

In this embodiment of the invention, when q+2, q+1 and q identify output waveguides within a common band, and $n_s$ is independent of wavelength, the value of R is given approximately by $\Delta v/v$ which is typically less than 0.001. When one of the output waveguides identified by the indices q+2, q+1 and q is in one band and the other two are in another band, then the value of R is approximately equal to (s+e), which is typically larger than unity.

FOURTH EXAMPLE EMBODIMENT

A fourth example embodiment of the invention provides an AWGR 50 having (Q+G−1)×N output waveguides and G×N input waveguides. The output waveguides are coupled to output slab waveguide 30 at angular positions which satisfy:

$$\alpha_{q,g} = \alpha_0 + \left(\frac{m'c}{n_s d}\right)\left[\frac{1}{v_0 - q\Delta v} - \frac{1}{v_0 + ((s+e)p + g)\Delta v}\right] \quad (36)$$

The input waveguides are coupled to input slab waveguide 20 at angular positions which satisfy:

$$\theta_{p,g} = \theta_0 + \left(\frac{m'c}{n_s d}\right)\left[\frac{1}{v_0 + ((s+e)p + g(1-\delta))\Delta v} - \frac{1}{v_0}\right] \quad (37)$$

In equations (32) and (33):
p=floor (q/Q) for each fixed value of g;
g is an integer selected from a predetermined set of integers. In one embodiment g∈{-1, 0, 1};
G is the number of members of the set from which g is selected; and,
s≧G.
With this construction, $$n_s d(\theta_{p,g} + \alpha_{q,g}) = (m'c)\left[\frac{1}{v_0 - q\Delta v} - \frac{1}{v_0} + \lambda_0 - \lambda_c + \Delta\lambda\delta g\right] \quad (38)$$

where $\Delta\lambda$ is given by:

$$\frac{1}{\Delta\lambda} = [v_0 + ((s+e)p + g(1-\delta))\Delta v][v_0 + ((s+e)p + g)\Delta v]. \quad (39)$$

This fourth example embodiment is similar to the second example embodiment described above except that, for g=0, the passbands are on a frequency grid rather than a wavelength grid. As in the second embodiment, changing g in value from 0 to 1, shifts all the passbands in wavelength by $\Delta\lambda\delta$ and changing g in value from 0 to -1, shifts all the passbands in wavelength by $-\Delta\lambda\delta$. For non-zero values of g the passbands are not precisely on a frequency grid; nevertheless, in some applications this shift in wavelength can be used to reduce the discrepancy between the optical frequency of a particular passband and the desired optical frequency for that passband. More generally, the overall performance will be different for different values of g and the AWGR can be tuned by selecting a value for g that provides for the best overall performance in a specific application.

Where a component (e.g. an assembly, device, waveguide, coupler, etc.) is referred to above, unless otherwise indicated, reference to that component (including a reference to a "means") should be interpreted as a reference to any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An optical apparatus comprising:
   a) a plurality of input waveguides;
   b) a first free propagation region optically coupled to the plurality of input waveguides;
   c) a second free propagation region;
   d) an arrayed waveguide grating optically coupling the first and second free propagation regions;
   e) first, second and third output waveguides optically coupled to the second free propagation region at angles $\alpha_{a-1}$, $\alpha_a$ and, $\alpha_{a+1}$ respectively such that the first output waveguide is adjacent to the second output waveguide and the second output waveguide is adjacent to the third output waveguide;
   wherein a value R given by:

$$R = 2 \times \left|\frac{(\alpha_{a-1} - 2\alpha_a + \alpha_{a+1})}{(\alpha_{a-1} - \alpha_{a+1})}\right|$$

has a value of 0.1 or more.

2. The apparatus of claim 1 wherein, for each of at least two of the plurality of input wave guides there exists a distinct group of the output waveguides having associated passbands such that ranges of wavelengths of the passbands corresponding to the distinct groups are non-overlapping and ranges of values of q corresponding to the waveguides in each of the distinct groups are non-overlapping.

3. The optical apparatus of claim 1 wherein $$\alpha_q = \alpha_0 + \left(\frac{m'\Delta\lambda}{n_s d}\right)\left(q + (s+e)\text{floor}\frac{q}{Q}\right)$$

where:
$\alpha_0$ and $\Delta\lambda$ are constants; m' is a function of a diffraction order of a passband associated with a specific output waveguide
q=0,1,2, . . . (Q×N−1);
p=0,1,2, . . . (N−1);
e is a number between zero and unity; and,
Q, N and s are positive integers.

4. The optical apparatus of claim 3 wherein e is greater than 0.1.

5. The optical apparatus of claim 3 wherein the plurality of output waveguides is centered at a pole of an output focal curve of the arrayed waveguide grating.

6. The optical apparatus of claim 3 wherein N input waveguides are coupled to input slab waveguide 20 at angular locations $\theta_p$ which satisfy:

$$\theta_p = \theta_0 - \left(\frac{m'\Delta\lambda}{n_s d}\right)(s+e)p$$

7. The optical apparatus of claim 6 wherein the plurality of input waveguides is centered at a pole of an input focal curve of the arrayed waveguide grating.

8. The optical apparatus of claim 1 wherein, for a first one of the input waveguides, passbands associated with a first plurality of successive consecutively adjacent ones of the output waveguides lie on a wavelength grid without gaps.

9. The optical apparatus of claim 8 wherein, for a second one of the input waveguides, passbands associated with a distinct second plurality of successive consecutively adjacent ones of the output waveguides lie on a wavelength grid without gaps.

10. The optical apparatus of claim 9 wherein the passbands associated with the first and second pluralities of output waveguides all lie on a wavelength grid without gaps.

11. The optical apparatus of claim 10 wherein adjacent ones of the first plurality of output waveguides and adjacent ones of the second plurality of output waveguides all have angular separations smaller than an angular separation between any one of the first plurality of output waveguides and any one of the second plurality of output waveguides.

12. The optical apparatus of claim 6 wherein the free propagation regions are of a material having an effective index of refraction, $n_s$, and spacing between adjacent ones of the output waveguides is given by:

$$\alpha_q - \alpha_{q-1} = \left(\frac{m'\Delta\lambda}{n_s d}\right)(1 + (s+e)\delta_{q,iQ})$$

where $\delta_{a,b}$ is Kroneker's delta function, I is an integer and m' is a function of a diffraction order of a passband associated with a specific output waveguide.

13. The optical apparatus of claim 6 comprising one or more dummy waveguides, the dummy waveguides located between adjacent ones of the output waveguides.

14. The optical apparatus of claim 13 wherein each of the output and dummy waveguides is coupled to the second free propagation region at an angular position given by:

$$\alpha_q = \alpha_0 + \left(\frac{m'\Delta\lambda}{n_s d}\right)\left(q - s' + \text{floor}\left(\frac{(q-s')}{(Q+s)}\right)\right)$$

where s' is an integer with $0 \leq s' \leq s$.

15. The optical apparatus of claim 6 wherein an angular separation between adjacent ones of the output waveguides is a function which varies periodically with q with a period N.

16. The optical apparatus of claim 1 having (Q+G−1)N output waveguides and G×N input waveguides wherein Q, G and N are integers, the output waveguides are coupled to the second free propagation region at angular position which satisfy:

$$\alpha_{q,g} = \alpha_0 + \left(\frac{m'\Delta\lambda}{n_s d}\right)\left(q + (s+e)\text{floor}\left(\frac{q}{Q}\right) + g\right)$$

and the input waveguides are coupled to the first free propagation region at angular positions which satisfy:

$$\theta_{p,g} = \theta_0 - \left(\frac{m'\Delta\lambda}{n_s d}\right)[(s+e)p + g(1-\delta)]$$

wherein:

q=0, 1, 2, ... N(Q+2)−1;

p=floor (q/Q);

g is an integer selected from a predetermined set of integers;

G is the number of members in the set from which g is selected; and,

S≧G.

17. The optical apparatus of claim 16 wherein g∈{−1, 0, 1}.

18. The optical apparatus of claim 16 comprising one or more dummy waveguides, the dummy waveguides located between adjacent ones of the output waveguides.

19. The optical apparatus of claim 1 comprising Q×N output waveguides coupled to the second free propagation region at angular locations $\alpha_q$ which satisfy:

$$\alpha_q = \alpha_0 + \left(\frac{m'c}{n_s d}\right)\left[\frac{1}{v_0 - q\Delta v} - \frac{1}{(v_0 + p(s+e)\Delta v)}\right]$$

and N input waveguides coupled to the first free propagation region at angular positions which satisfy:

$$\theta_p = \theta_0 + \left(\frac{m'c}{n_s d}\right)\left[\frac{1}{v_0 + p(s+e)\Delta v} - \frac{1}{v_0}\right]$$

wherein:

c is the speed of light in vacuum; and, p=floor (q/Q).

20. The optical apparatus of claim 1 comprising (Q+G−1)N output waveguides and G×N input waveguides wherein the output waveguides are coupled to the second free propagation region at angular positions which satisfy:

$$\alpha_{q,g} = \alpha_0 + \left(\frac{m'c}{n_s d}\right)\left[\frac{1}{v_0 - q\Delta v} - \frac{1}{v_0 + ((s+e)p + g)\Delta v}\right]$$

and the input waveguides are coupled to the first free propagation region at angular positions which satisfy:

$$\theta_{p,g} = \theta_0 + \left(\frac{m'c}{n_s d}\right)\left[\frac{1}{v_0 + ((s+e)p + g(1-\delta))\Delta v} - \frac{1}{v_0}\right]$$

wherein:

P=floor (q/Q) for each fixed value of g;

g is an integer selected from a predetermined set of integers;

G is the number of members of the set from which g is selected; and, s≧G.

21. The optical apparatus of claim 20 wherein g∈{−1, 0, 1}.

22. An optical apparatus comprising:

a) a first free propagation region b) a plurality of input waveguides optically coupled to the first free propagation region;

c) a second free propagation region;

d) an optical grating comprising a plurality of unequal length grating waveguides optically coupling the first and second free propagation regions; and, e) a plurality of consecutively adjacent output waveguides coupled to the second free propagation region at angular locations $\alpha_q$ where q is an index and ranges over the values 0, 1, ..., M−1 and $\alpha_q$ changes monotonically as q increases;

wherein the output waveguides are coupled to the second free propagation region at angular positions such that the value R given by:

$$R = \left|\frac{\left(\frac{d^2 a_q}{dq^2}\right)}{\left(\frac{d a_q}{dq}\right)}\right|$$

has a value of 0.1 or more for at least some sets of adjacent ones of the output waveguides where $$\left(\frac{d a_q}{dq}\right)$$

is the discrete derivative of $\alpha_q$, $$\left(\frac{d^2\alpha_q}{dq^2}\right)$$

is the discrete second derivative of $\alpha_q$.

23. An arrayed waveguide grating device comprising:
   a) a first free propagation region;
   b) a plurality of input waveguides optically coupled to the first free propagation region;
   c) a second free propagation region;
   d) an optical grating comprising a plurality of unequal length grating waveguides optically coupling the first and second free propagation regions; and,
   e) N groups of Q sequential output waveguides coupled to the second free propagation region at angular locations $\alpha_q$ where q is an index and ranges over the values 0, 1, . . . , Q×N−1 and $\alpha_q$ changes monotonically as q increases;
   wherein:
      each of the N groups of output waveguides is associated with at least one of the input waveguides,
      for each of the N groups, angular spacings between adjacent output waveguides both belonging to the group are significantly less than angular spacings between any waveguide in the group and any waveguide in any other group, and,
      for each of the waveguides in each of the N groups and the associated input waveguide there exists a passband and a range of the wavelengths associated with the passbands for each of the N groups is non-overlapping with the range of passband wavelengths for other ones of the N groups;
      the arrayed waveguide device in combination with an optical device operating as a 1×N demultiplexer having N outputs each optically coupled to one of the input waveguides associated with a different one of the N groups.

24. The arrayed waveguide grating device of claim 23 wherein the passband wavelengths of the output waveguides are substantially on a frequency grid.

25. The arrayed waveguide grating device of claim 23 wherein the passband wavelengths of the output waveguides are substantially on a wavelength grid.

26. The arrayed waveguide grating device of claim 23 wherein the value of R given by:

$$R = 2 \times \left|\frac{(\alpha_{q-1} - 2\alpha_q + \alpha_{q+1})}{(\alpha_{q-1} - \alpha_{q+1})}\right|$$

varies periodically with q.

27. The arrayed waveguide grating device of claim 26 wherein R given by:

$$R = 2 \times \left|\frac{(\alpha_{q-1} - 2\alpha_q + \alpha_{q+1})}{(\alpha_{q-1} - \alpha_{q+1})}\right|$$

does not have a value exceeding 0.01 for any two successive values of q.

28. The arrayed waveguide grating device of claim 26 wherein R given by:

$$R = 2 \times \left|\frac{(\alpha_{q-1} - 2\alpha_q + \alpha_{q+1})}{(\alpha_{q-1} - \alpha_{q+1})}\right|$$

has a value exceeding 0.01 for one or more particular values of q, and for values of q adjacent to said one or more particular values, R has a value not exceeding 0.01.

29. The arrayed waveguide device combination of claim 23 comprising an optical switch in an optical path between one of the N outputs of the demultiplexer and the input waveguide to which the one of the N outputs is coupled.

30. An optical apparatus comprising:
   at least first and second input waveguides;
   an input free propagation region optically coupled to the at least first and second input waveguides;
   an output free propagation region;
   an arrayed waveguide grating optically coupling the input and output free propagation regions;
   M output waveguides, where M is an integer and M≧6, each optically coupled to the output free propagation region at an angular position $\alpha$, relative to an axis of the arrayed waveguide grating, where i is an index which increases with angular position, with 0≦i≦M−1, and wherein M is greater than the number of input waveguides;
   wherein no output waveguides are located between any two adjacent ones of the output waveguides,
   each of a first M−1 of the output waveguides is separated from an adjacent one of the output waveguides by an angular spacing $\Delta_i = |\alpha_{i+1} - \alpha_i|$, and,
   $\Delta_i$ varies periodically with i, when i has a value of a, $$|\Delta_a - \Delta_{a+1}| > 0.005 \times |\Delta_a + \Delta_{a+1}|.$$

31. The optical apparatus of claim 30 wherein, when i has a value a, $$|\Delta_a - \Delta_{a+1}| > 0.05 \times |\Delta_a + \Delta_{a+1}|.$$

32. The optical apparatus of claim 30 wherein, when i has a different value, b, $$|\Delta_b - \Delta_{b+1}| \leq 0.005 \times |\Delta_b + \Delta_{b+1}|$$

33. The optical apparatus of claim 32 wherein $|\Delta_b - \Delta_{b+1}| \leq 0.005 \times |\Delta_b + \Delta_{b+1}|$ for all values of b with b in the range of a+1 to a+c with c an integer and c≧3.

34. The optical apparatus of claim 33 wherein for b=c+1, $$|\Delta_b - \Delta_{b+1}| \geq 0.05 \times |\Delta_b + \Delta_{b+1}|.$$

35. The optical apparatus of claim 34 wherein a transfer function between each of the output waveguides and one of the input waveguides provides a passband and wavelengths of the passbands corresponding to the output waveguides are substantially on a frequency grid.

36. The optical apparatus of claim 34 wherein, for i=a, the frequency of the passband $v_{a+1}$ is between the frequencies of the passbands $v_a$ and $v_{a+2}$.

37. The optical apparatus of claim 35 wherein, for each value of a such that when i has the value a, $|\Delta_a - \Delta_{a+1}| > 0.005 \times |\Delta_a + \Delta_{a+1}|$, the frequency of the passband $v_{a+1}$ is between the frequencies of the passbands $v_a$ and $v_{a+2}$.

38. The optical apparatus of claim 34 wherein a transfer function between each of the output waveguides and one of the input waveguides provides a passband and wavelengths of the passbands corresponding to the output waveguides are substantially on a wavelength grid.

39. The optical apparatus of claim 38 wherein, for i=a, the wavelength of the passband $\lambda_{a+1}$ is between the wavelengths of the passbands $\lambda_a$ and $\lambda_{a+2}$.

40. The optical apparatus of claim 39 wherein, for each value of a such that when i has the value a, $|\Delta_a - \Delta_{a+1}| > 0.005 \times |\Delta_a + \Delta_{a+1}|$, the wavelength of the passband $\lambda_{a+1}$ is between the wavelengths of the passbands $\lambda_a$ and $\lambda_{a+2}$.

41. An arrayed waveguide grating device comprising:
a) a first free propagation region;
b) a plurality of input waveguides optically coupled to the first free propagation region;
c) a second free propagation region;
d) an optical grating comprising a plurality of unequal length grating waveguides optically coupling the first and second free propagation regions; and,
e) N groups of Q sequential output waveguides coupled to the second free propagation region at angular locations $\alpha_q$ where q is an index and ranges over the values 0, 1, . . . , Q×N−1 and $\alpha_q$ changes monotonically as q increases;

wherein:
each of the N groups of output waveguides is associated with at least one of the input waveguides,
for each of the N groups, angular spacings between adjacent output waveguides both belonging to the group are significantly less than angular spacings between any waveguide in the group and any waveguide in any other group, and,
for each of the waveguides in each of the N groups and the associated input waveguide there exists a passband and a range of the wavelengths associated with the passbands for each of the N groups is non-overlapping with the range of passband wavelengths for other ones of the N groups,
the value of R given by:

$$R = 2 \times \left| \frac{(\alpha_{q-1} - 2\alpha_q + \alpha_{q+1})}{(\alpha_{q-1} - \alpha_{q+1})} \right|$$

varies periodically with q, R has a value exceeding 0.01 for one or more particular values of q, and for values of q adjacent to said one or more particular values, and R has a value not exceeding 0.01.

42. The arrayed waveguide device of claim 41 in combination with an optical device operating as a 1×N demultiplexer having N outputs each optically coupled to one of the input waveguides associated with a different one of the N groups.

43. An arrayed waveguide grating device comprising:
a) a first free propagation region;
b) a plurality of input waveguides optically coupled to the first free propagation region;
c) a second free propagation region;
d) an optical grating comprising a plurality of unequal length grating waveguides optically coupling the first and second free propagation regions; and,
e) N groups of Q sequential output waveguides coupled to the second free propagation region at angular locations $\alpha_q$ where q is an index and ranges over the values 0, 1, . . . , Q×N−1 and $\alpha_q$ changes monotonically as q increases;

wherein:
each of the N groups of output waveguides is associated with at least one of the input waveguides,
for each of the N groups, angular spacings between adjacent output waveguides both belonging to the group are significantly less than angular spacings between any waveguide in the group and any waveguide in any other group, and,
for each of the waveguides in each of the N groups and the associated input waveguide there exists a passband and a range of the wavelengths associated with the passbands for each of the N groups is non-overlapping with the range of passband wavelengths for other ones of the N groups,
the value of R given by:

$$R = 2 \times \left| \frac{(\alpha_{q-1} - 2\alpha_q + \alpha_{q+1})}{(\alpha_{q-1} - \alpha_{q+1})} \right|$$

varies periodically with q, and R does not have a value exceeding 0.01 for any two successive values of q.

* * * * *